Figure 1:
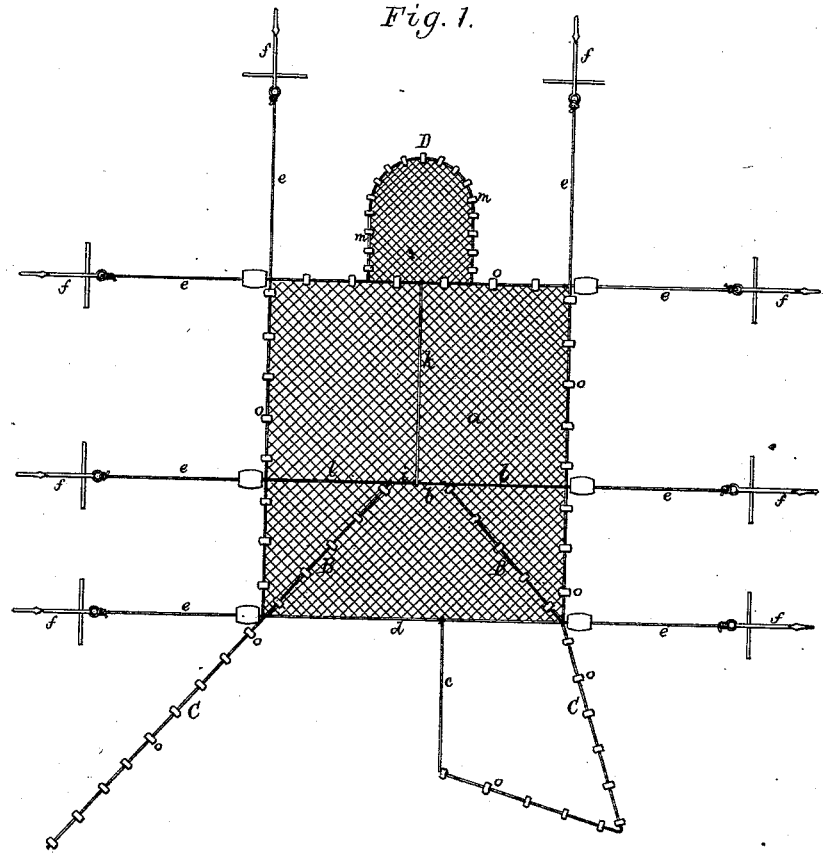

H. WEBB.
Fish-Trap.

No. 215,031.  Patented May 6, 1879.

Witnesses.
S. U. Piper
P. W. Nichols

Inventor
Henry Webb,
by attorney,
R. H. Eddy

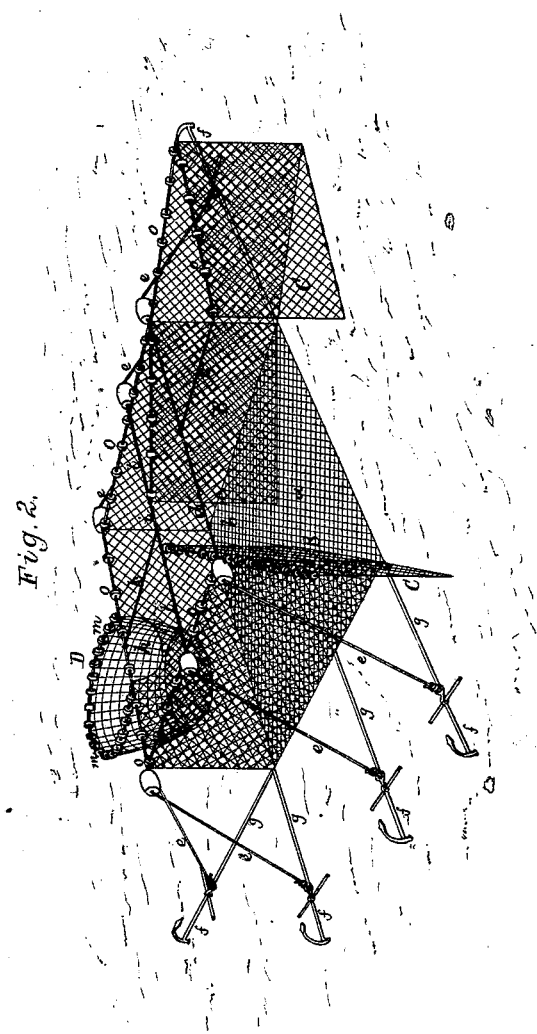

UNITED STATES PATENT OFFICE.

HENRY WEBB, OF ROCKPORT, MASSACHUSETTS.

IMPROVEMENT IN FISH-TRAPS.

Specification forming part of Letters Patent No. 215,031, dated May 6, 1879; application filed January 15, 1879.

*To all whom it may concern:*

Be it known that I, HENRY WEBB, of Rockport, of the county of Essex and State of Massachusetts, have invented a new and useful Improvement in Fish-Traps; and do hereby declare the same to be described in the following specification and represented in the accompanying drawings, of which—

Figure 1 is a top view, and Fig. 2 a perspective view, of a trap with my invention.

The nature of my invention is explained in the claim or claims hereinafter made; and consists, first, in the combination of the netting trap-body, open in rear and provided with a bottom and floats and a pocket, as explained, with stationary guides and movable wings and sundry stay-lines, all essentially as hereinafter explained; second, in the combination of the stationary guides and the movable wings and series of stay-lines, as described, with the trap-body, open in rear and provided with a bottom and floats, as represented; third, in the combination of the netting trap-body, open in rear and provided with floats and a series of anchors, support-lines, brace-lines, and a pocket, with stationary guides, movable wings, and a brace-line to one of such wings, all substantially as specified.

This trap, like a seine, is made of netting, and is square or rectangular in shape, and provided with a bottom, $a$. This trap is open at its rear end, and is there furnished with two stationary guides, B B, leading obliquely into it from the ends of its sides and up from the bottom, such guides being composed of netting, there being an opening, $b$, between their inner ends. The trap is also furnished with movable wings C C, also of netting, which, connected with it at the rear ends of its sides, are to extend outwardly from the trap in manner as shown.

To the upper edges of the trap, the guides, and the wings, floats O are fixed, sufficient to buoy the trap when in the sea, so that its sides and the guides and wings may stand vertically, or about so, therein, and its bottom rest on that of the sea. The wings are not to be fixed at their lower edges to the bottom. One of them, however, is bent around or turned inward, as shown, and, by a line, $c$, attached to it at its end, is connected with the middle of a line, $d$, extending across the mouth of the trap. While the other wing, arranged as represented, serves to direct the fish into the trap, the bent wing answers to intercept and turn back into it fish that may escape from it. The guides not only guide fish into the trap, but prevent escape of fish therefrom.

The trap is held in place in the sea by ropes $e$ leading from the upper edge of the trap to anchors $f$, arranged as shown, there being fixed to such anchors and to the bottom of the trap elastic stay-lines or connections $g$. Such stay-lines allow the bottom of the trap to conform to the surface of the bottom of the sea, and hold it down thereon.

Furthermore, there is in front of the trap a purse or pocket, D, of netting, it being open at top and there provided with a series of floats, $m$. It communicates with the trap by an opening, $h$, leading from one to the other at the upper part of the front end of the trap.

Whenever a sufficient number of fish may have entered the trap, its bottom, at its rear end, should be lifted off the bottom of the sea high enough to cause the fish to pass into the intercepting-pocket.

At their inner ends the guides are connected at their upper edges by a rope, $i$, and are supported in place by stay-ropes $k\ l\ l$, leading to the sides of the trap in manner as shown.

Prior to my invention it has been customary to make "heart" or "pound" nets with wings and a pocket; but they have generally been supported by posts or piles, or by anchors and lines therefrom, leading from the upper corners of the net.

With my net or trap I am enabled to dispense with the setting-poles, and to support the whole in place, both at top and bottom, by anchors and at top by brace-lines, arranged as represented, such enabling me to use the net in places or deep water where it would be difficult, if not impossible, to employ piles or merely a single line to each anchor.

I claim as my invention as follows, viz:

1. The combination of the netting trap-body A, open in rear and provided with a bottom and floats and a pocket, as explained, with the stationary guides B B and movable wings C C, and the stay-lines $c\ d\ i\ k\ l$, all being substantially as set forth.

2. The combination of the stationary guides B B and the movable wings C C and stay-lines $c\ d\ i\ k\ l$, with the trap-body, open in rear and provided with a bottom and floats, as represented.

3. The combination of the netting trap-body A, open in rear and provided with floats and a series of anchors, $f$, support-lines $e\ g$, brace-lines $d\ i\ k\ l$, and a pocket, D, with the stationary guides B B and movable wings C, and the brace-line $c$ of one of such wings, all being substantially as set forth.

HENRY WEBB.

Witnesses:
R. H. EDDY,
S. N. PIPER.